Feb. 28, 1933.  W. H. FOSTER  1,899,027
SPEED CONTROL MEANS
Filed Aug. 20, 1930  5 Sheets-Sheet 3
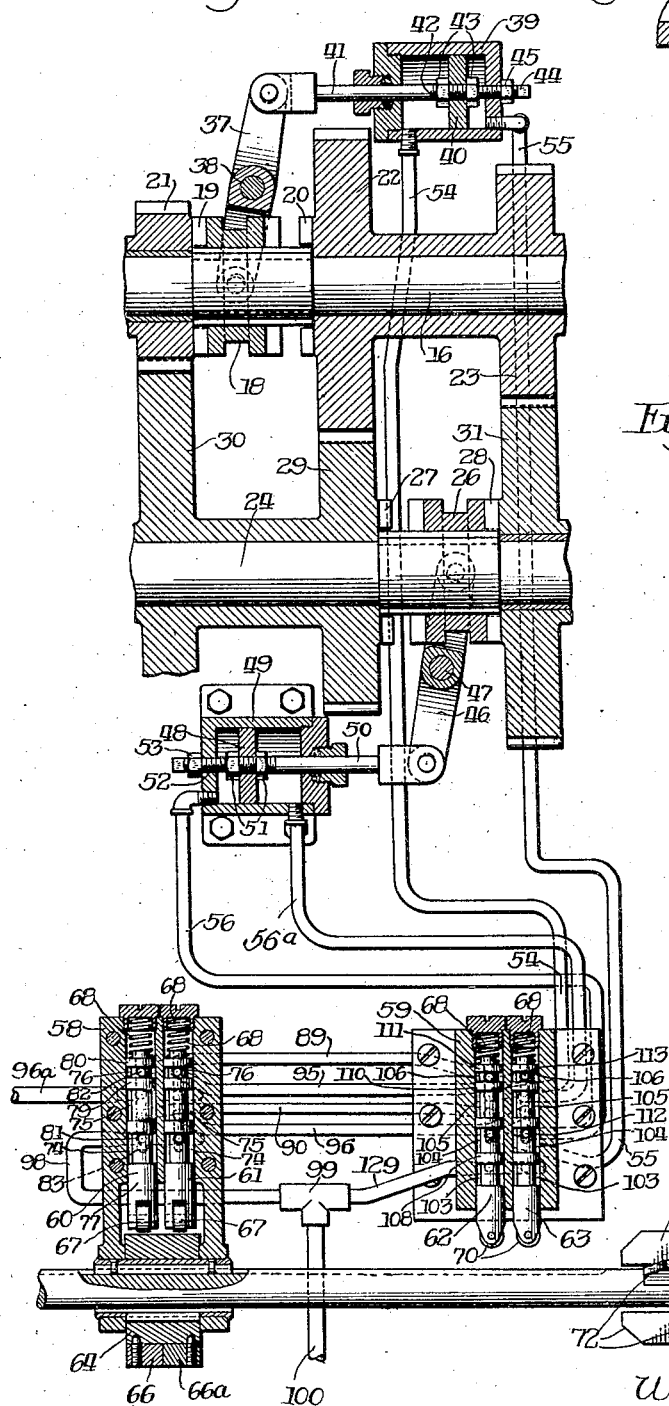
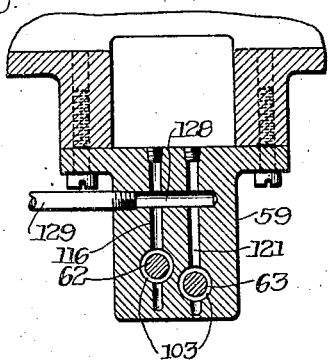
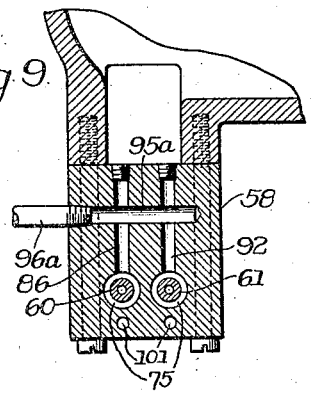
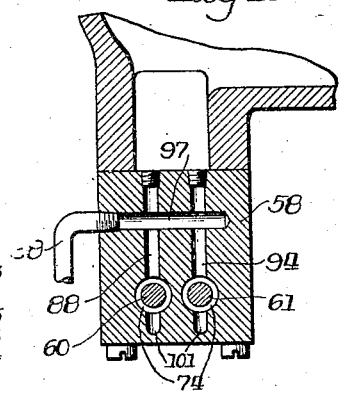
Inventor:
William H. Foster.
By Wilkinson, Huxley, Byron and Knight Attys Feb. 28, 1933.  W. H. FOSTER  1,899,027
SPEED CONTROL MEANS
Filed Aug. 20, 1930  5 Sheets-Sheet 4
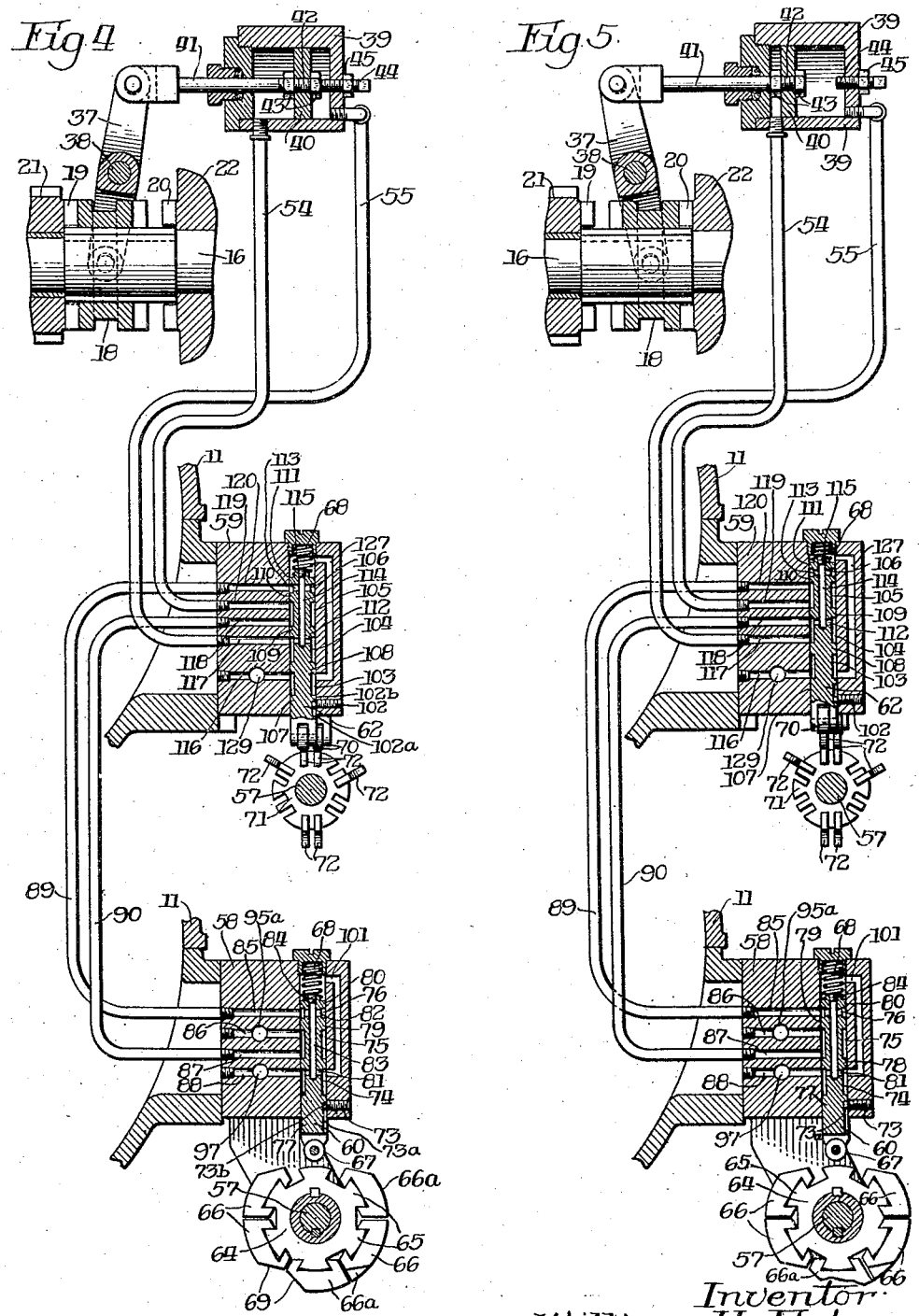
Inventor:
William H. Foster.
By Wilkinson, Huxley, Byron & Knight
attys Feb. 28, 1933.    W. H. FOSTER    1,899,027
SPEED CONTROL MEANS
Filed Aug. 20, 1930    5 Sheets-Sheet 5
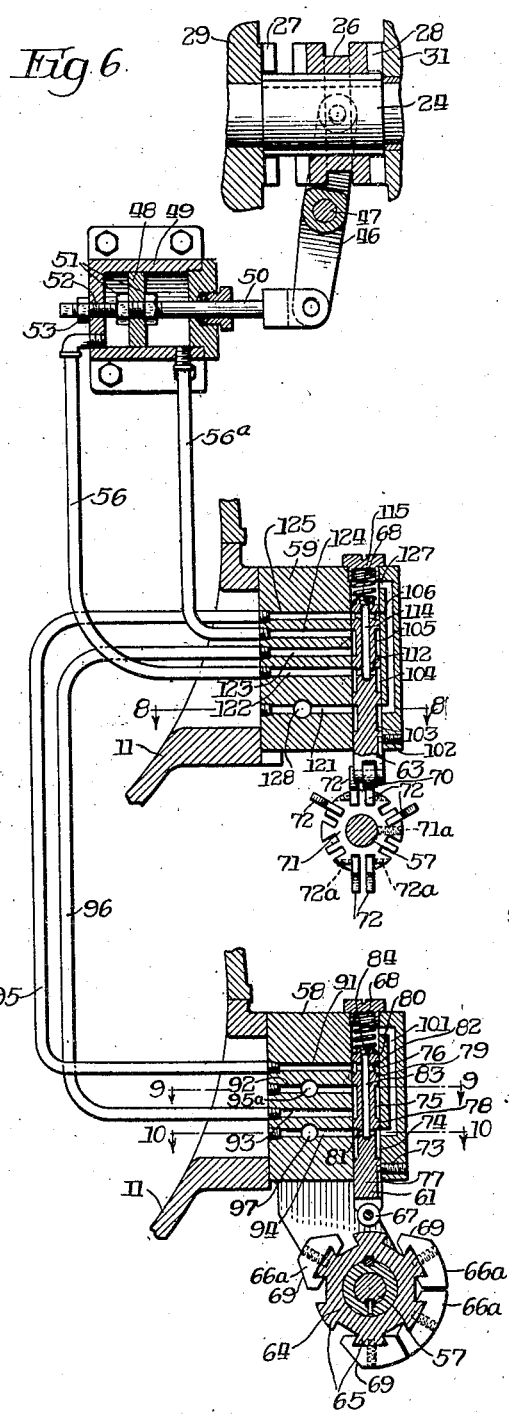
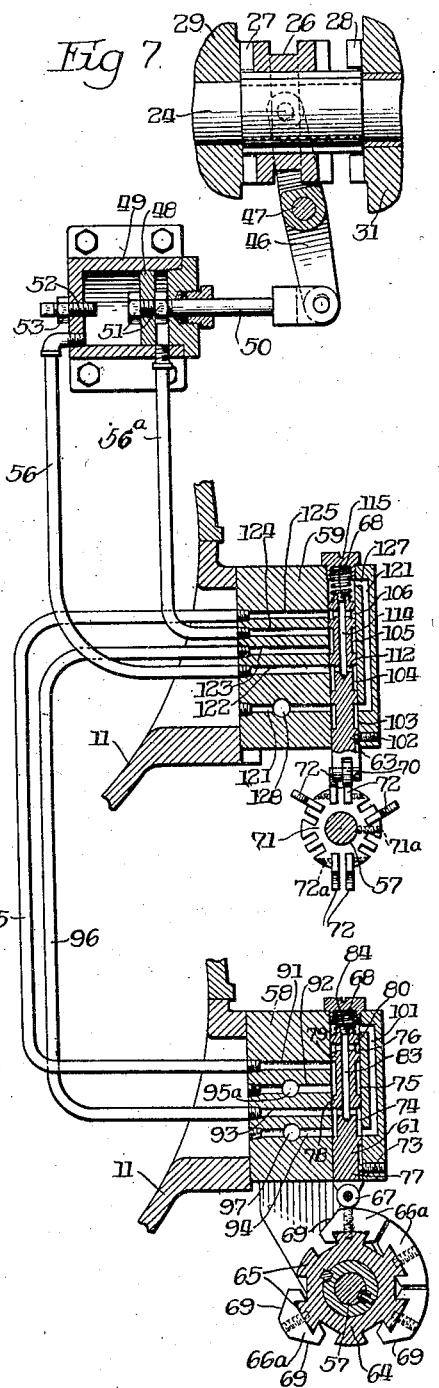
Inventor:
William H. Foster.
By Wilkinson, Huxley, Byron & Knight
Attys Patented Feb. 28, 1933

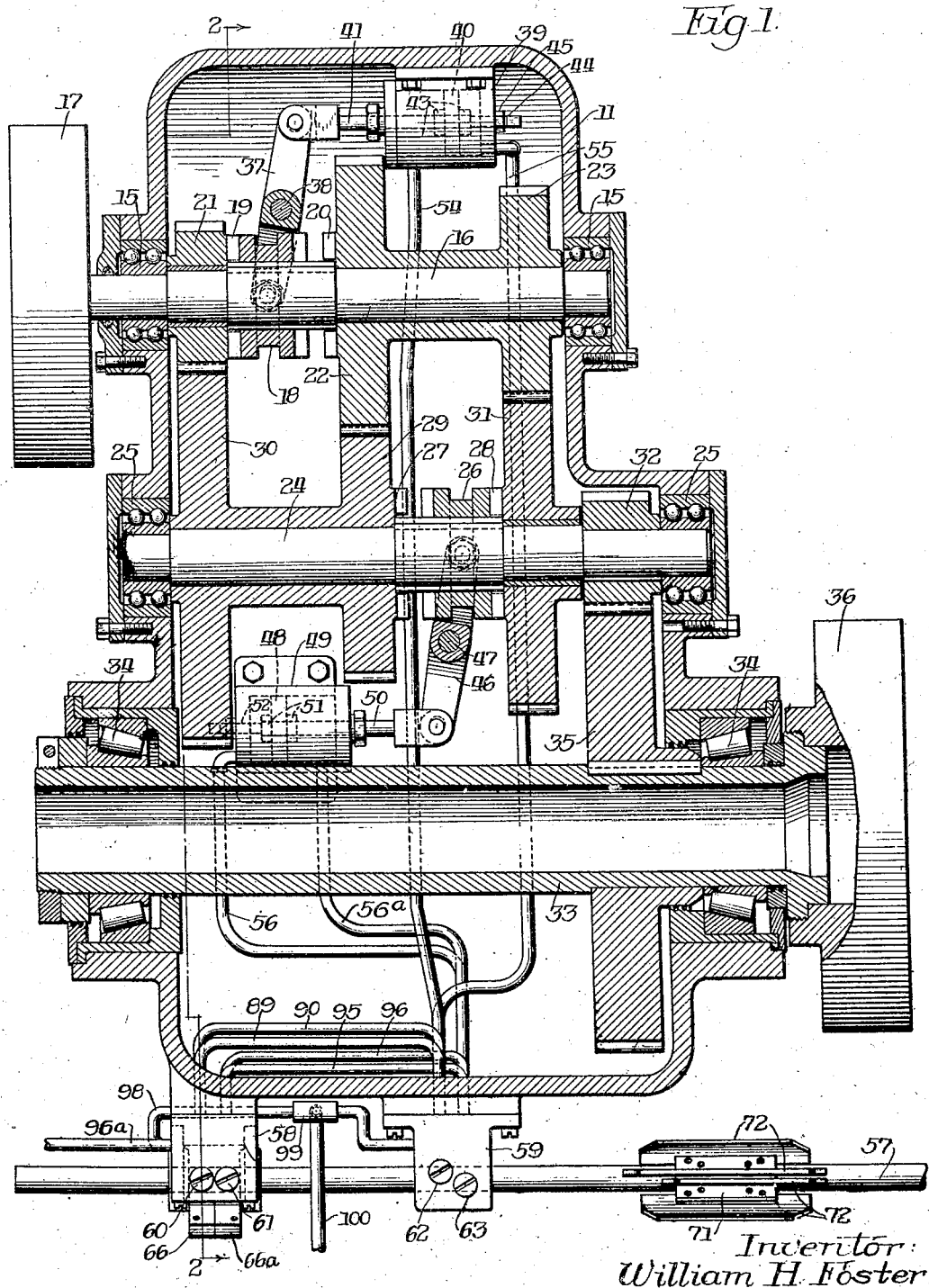

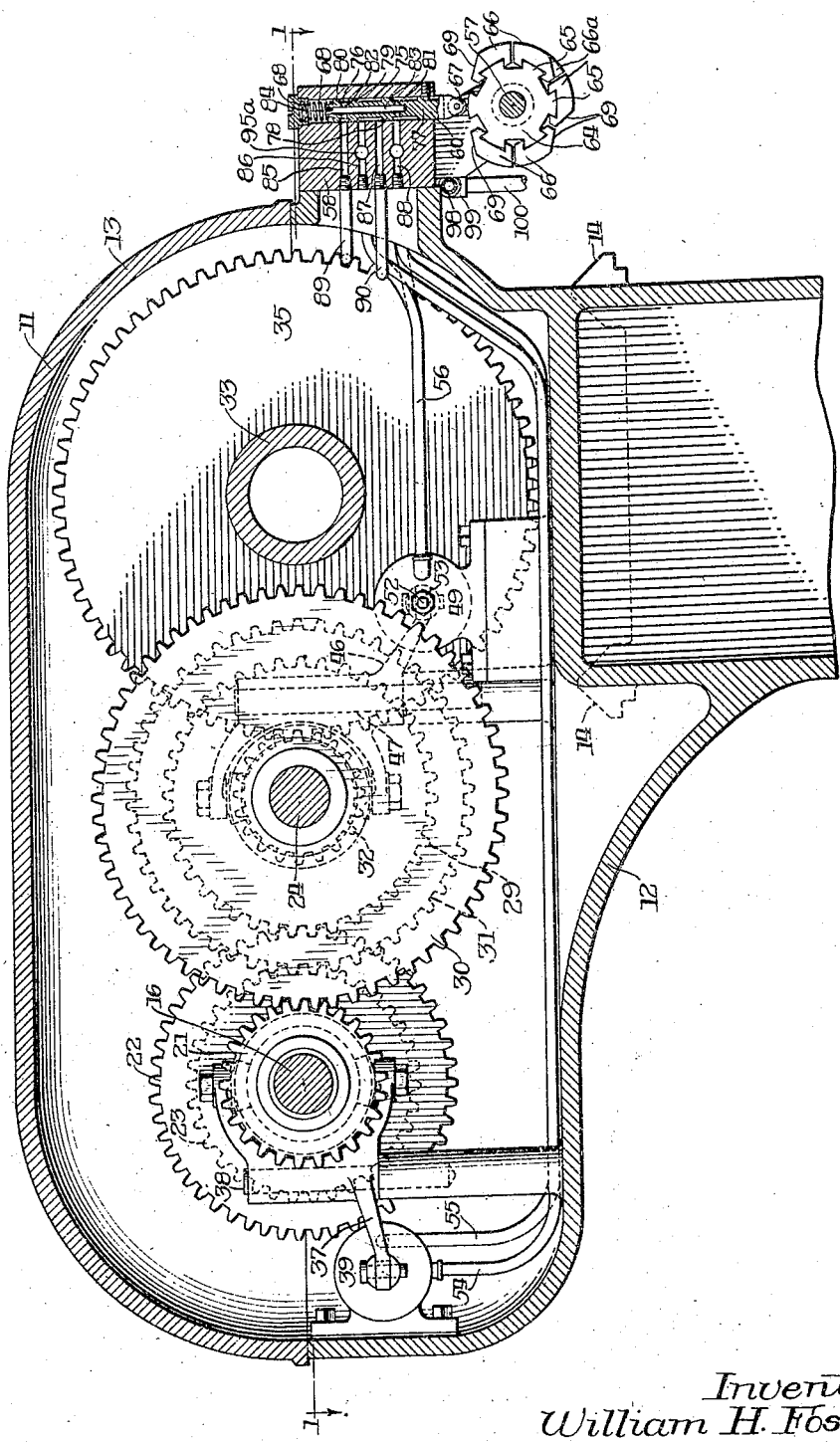

1,899,027

UNITED STATES PATENT OFFICE

WILLIAM H. FOSTER, OF ELKHART, INDIANA

SPEED CONTROL MEANS

Application filed August 20, 1930. Serial No. 476,506.

The present invention relates to speed control means.

The present invention has been illustrated and will be described in connection with turret lathes, to which type of machinery it is particularly adaptable. As the description proceeds, however, it will be clear that the invention is not limited to turret lathes, but has a wider field of application.

The present invention contemplates mechanism peculiarly adapted to turret lathe practice whereby the speed of rotation of the chuck holding the work to be operated upon may be varied according to a predetermined sequence. It is an object of the present invention to provide improved mechanism whereby this result may be accomplished.

A further object is to provide speed control mechanism adapted to turret lathe practice for automatically selecting a predetermined speed of rotation of the chuck of a turret lathe or the like for each operation of the turret thereof and for changing said speed during any or all of the operations of said turret according to a predetermined sequence.

A further object is to provide hydraulic speed changing mechanism applicable to the spindle of a turret lathe, with means for controlling said speed changing mechanism, not only for each trip of the turret, but during each trip of said turret, if required.

A further object is to provide control means for the spindle of a turret lathe or the like well adapted to meet the needs of modern commercial service.

Further objects will appear as the description proceeds.

Referring to the drawings—

Figure 1 is a plan section of certain speed changing mechanism which may be used in the practice of the present invention, said section being taken along the plane indicated by the arrows 1—1 of Figure 2;

Figure 2 is a vertical section taken along the planes indicated by the arrows 2—2 of Figure 1;

Figure 3 is a diagrammatic view of certain salient parts of the structure shown in Figure 1, certain of said parts being turned out of their normal positions for clarity of disclosure;

Figures 4, 5, 6 and 7 are diagrammatic views showing portions of the layout of Figure 3;

Figure 8 is a section taken along the plane indicated by the arrows 8—8 of Figure 6;

Figure 9 is a section taken along the plane indicated by the arrows 9—9 of Figure 6; and Figure 10 is a section taken along the plane indicated by the arrows 10—10 of Figure 6.

Referring first to Figures 1 and 2, the numeral 11 indicates a housing for change speed mechanism. Said housing 11 may be mounted upon the frame 12 of a turret lathe or the like. Figure 2 shows a portion of the frame of a turret lathe, and is formed to provide part of the housing 11, the cover 13 being provided to complete said housing 11. Said frame 12 is provided with the ways 14—14 for slidably mounting a turret slide (not shown). The housing 11 is provided with bearings 15—15 for rotatably supporting the shaft 16. Said shaft 16 may be driven by the pulley 17, or any other power communicating device. Splined to the shaft 16 is the double-faced clutch element 18 adapted to selectively cooperate with clutch elements 19 and 20, which clutch elements 19 and 20 are rigid, respectively, with the gears 21 and 22, which gears 21 and 22 are rotatably disposed upon the shaft 16. Rigid with the gear 22 is the gear 23.

Disposed in parallel relationship with the shaft 16 is the shaft 24, rotatably carried by the housing 11 by means of the bearings 25—25. Splined to the shaft 24 is the double-faced clutch element 26 adapted to selectively cooperate with the clutch elements 27 and 28. The clutch element 27 is rigid with the gear 29, which meshes with the gear 22. Rigid with the gear 29 is the gear 30, meshing with the gear 21. The clutch element 28 is rigid with the gear 31, meshing with the gear 23. Said gears 29 and 30 on the one side of the clutch element 26 and the gear 31 on the other side of the clutch element 26 are rotatably carried by the shaft 24. Keyed to the shaft 24 is the gear or pinion 32.

Disposed in parallel relationship with the shafts 16 and 24 is the spindle 33, carried by the housing 11 by means of the bearings 34—34. Keyed to the spindle 33 is the gear 35, which gear meshes with the gear 32. The spindle 33 carries at its forward extremity the chuck 36 for carrying the work to be operated upon.

The clutch element 18 is adapted to be moved along the splined portion of the shaft 16 by means of the lever 37, which lever is swingingly mounted upon the pin 38 supported by the housing 11. Said lever 37 may be provided with a yoke, or other preferred construction, whereby the swinging movement of said lever will communicate the longitudinal movement above mentioned to the clutch element 18. For moving said lever 37, the present invention contemplates an operating cylinder 39 rigidly mounted within the housing 11. Said cylinder 39 is provided with the plunger 40, provided with the stem 41, which stem 41 is hingedly connected to the lever 37 with a sufficiently loose connection to prevent binding. Said stem 41 is screw-threaded throughout a portion of its length, as indicated by the numeral 42, for the reception of the nuts 43—43. By modifying the position of said nuts 43—43, the position of the plunger 40 relative to the swinging extremity of the lever 37 may be adjusted. Movement of the plunger 40 toward the right as the parts are viewed in Figures 1, 3, 4 and 5 may be stopped by the adjustable screw member 44 extending through the right-hand cylinder head of the cylinder 39. A lock nut 45 is provided for holding the adjusting screw member 44 in fixed position.

The position of the clutch element 26 longitudinally of the shaft 24 is controlled by the lever 46, which may be provided with a yoke or other means adapted to communicate the movement referred to. Said lever 46 is adapted to swing about the pin 47, which is carried by the housing 11. The lever 46 is controlled by the plunger 48 within the cylinder 49, which cylinder may be rigidly supported by the housing 11. Said plunger 48 is rigidly mounted upon the stem 50, the outer extermity of which stem is connected, through a loose connection, with the lever 46. Said steam 50 is screw-threaded throughout a portion of its length for the reception of a pair of nuts 51—51, by adjustment of which the plunger 48 may be adjusted longitudinally of the stem 50. Movement of the plunger 48 to the left as the parts are viewed in Figures 1, 6 and 7 may be controlled by the screw member 52 threaded into the corresponding cylinder head of the cylinder 49. The lock nut 53 may be provided for holding the screw member 52 in fixed position.

Communicating with the left-hand end of the cylinder 39 as the parts are viewed in Figures 1, 3, 4 and 5 is the conduit 54. Communicating with the right-hand end of said cylinder 39 is the conduit 55. Communicating with the left-hand end of the cylinder 49 as the parts are viewed in Figures 1, 3, 6 and 7, is the conduit 56, while communicating with the right-hand end thereof is the conduit 56a. Pressure may be selectively applied to said conduits according to a predetermined sequence, by means of mechanism which will now be described.

Referring particularly to Figures 1 and 2, the numeral 57 indicates a shaft carried by and reciprocable with the turret slide riding upon the ways 14—14 (Fig. 2). Said shaft 57, in accordance with practice well known in turret lathes, is rotated through part of the circumference of a circle with each indexing or turning movement of the turret carried by said turret slide. Said shaft 57 in its successive rotation positions controls the operation of a pair of valves, which will be described presently. Said shaft 57 in predetermined longitudinal positions controls a pair of other valves, which will be described presently. The valves referred to control the pressures within the conduits 54, 55, 56 and 56a, above mentioned.

Disposed upon a side of the housing 11 are a pair of valve housings 58 and 59, of which the housing 58 provides bores for two reciprocating plungers 60 and 61 and the housing 59 provides bores for the two reciprocating plungers 62 and 63. Said plungers 60 and 61, in cooperation with the valve housing 58, and the plungers 62 and 63 in cooperation with valve housing 59, constitute the pairs of valves above referred to. Said plungers 60 and 61 are adapted to be controlled in response to the rotative action of the shaft 57, and said plungers 62 and 63 are adapted to be controlled in response to the longitudinal action of the shaft 57. In order to provide for the coaction between the plungers 60 and 61 and the shaft 57 in the rotative action of said shaft, said shaft has fixedly mounted thereon the cam holding member 64, provided with a plurality of equally spaced tenons 65, each of which is adapted to have disposed thereon a cam 66 and a cam 66a. The corresponding extremity of each of the plungers 60 and 61 is provided with a roller 67 having its plane of rotation disposed at right angles to the axis of the shaft 57. The plunger 60 is adapted to cooperate with the cams 66 and the plunger 61 is adapted to cooperate with the cams 66a. When a cam 66 or a cam 66a is disposed in cooperative relationship with either or both of the rollers 67 of the plungers 60 and 61, either or both of said plungers will be held in their uppermost positions. Said plungers are provided with springs 68—68 for urging same outwardly or downwardly toward the axis of the shaft 57. In order to provide smooth action of the plungers 60 and 61, certain of said cams 66 and 66a are provided with beveled edges 69—69 parallel with the axis of said shaft 57. Said beveled edges 69—69 will, of course, be disposed in positions to cause the smooth and gradual action of the plungers 60 and 61 as said plungers are actuated outwardly under the influence of the springs 68—68, or actuated inwardly against the tension of said springs by said cams 66 or 66a.

The plungers 62 and 63 are provided with rollers 70—70 disposed in planes parallel to the axis of the shaft 57. Springs 68—68 urge said plungers 62 and 63 outwardly. As shown in Figures 1, 4, 5, 6 and 7, the plungers 62 and 63 are disposed in different planes parallel to the axis of the shaft 57. Expressed in other language, the rollers 70—70 mounted upon said plungers 62 and 63 are disposed in different planes transversely of shaft 57. Mounted upon the shaft 57 is a cam holder 71 adapted to hold a plurality of pairs of cams 72—72, said pairs corresponding to the number of tenons on the cam holding member 64. Said cam holder 71 may be adjustably held in position on the shaft 57 by means of the setscrew 71a. Said cam holder 71 is provided with a plurality of pairs of slots for holding said cams 72—72, setscrews 72a—72a (Figs. 3, 6 and 7) being provided for adjustably holding said cams 72—72 in position. The cam holder 71 is adapted to hold a plurality of pairs of cams 72, which pairs of cams correspond to the indexed positions of the turret (not shown), it being understood, of course, that any or all of the cams 72—72 may be omitted if desired. The members of each pair of said cam members are adapted to engage the rollers 70—70 of the plungers 62 and 63. Consequently the positions of said plungers 62 and 63 relative to their housing 59 correspond to the longitudinal position of the shaft 57, or, expressed in other language, correspond to the position of the turret of the lathe longitudinally of the ways 14, the particular actuation of said plungers 62 and 63 depending upon the positioning of the cams 72—72.

The plungers 60 and 61 may be identical and a description of one of said plungers will suffice for a description of both. Each of said plungers is limited in its outward or downward movement by means of the setscrew 73 (Figs. 4 and 5), which setscrew has a reduced end portion riding within a slot 73a disposed longitudinally of the corresponding plunger. Said slot is provided at its upper or inner extremity with a shoulder 73b adapted to engage the extremity of said setscrew 73. Each of the plungers 60 and 61 is provided with a plurality of annular grooves, indicated by the numerals 74, 75 and 76, which grooves are defined by the relatively large portions 77, 78, 79 and 80, which relatively large portions have a slidable relatively liquid-tight fit within their corresponding bores. Each of the plungers 60 and 61 is provided with a pair of cross passages 81 and 82, which cross passages also communicate with the bore 83 of the corresponding plunger 60 or 61. Said bore 83 in each of said plungers 60 and 61 extends only part way toward the lower extremity of the corresponding plunger. The upper extremity of each of said bores is closed by the plug 84. The valve housing 58, which carries the plungers 60 and 61, is provided with passageways 85, 86, 87 and 88 (Figs. 4 and 5) communicating with the bore of the plunger 60. The outer extremities of the passageways 85 and 87 communicate with conduits 89 and 90, which lead to the plunger 62, to be referred to presently. The outer extremities of the passageways 86 and 88 are plugged up.

The valve housing 58 is also provided with passageways 91, 92, 93 and 94 (Figs. 6 and 7) communicating with the bore within which the plunger 61 slides. Said passageways 91 and 93 are connected to conduits 95 and 96, respectively, which conduits lead to plunger 63, to be referred to presently. The outer extremities of the passageways 92 and 94 are plugged up. By reference to Figures 6 and 9 it will be noted that the passageways 86 and 92 are connected by means of the passageway 95a, which passageway communicates with the conduit 96a, which leads to a source of fluid pressure (not shown). By reference to Figures 6 and 10 it will be noted that passageways 88 and 94 are connected together by means of the passageway 97, which communicates with the conduit 98. Said conduit 98 leads to the T-connection 99 (Fig. 3), which is connected, through the conduit 100, to a reservoir of fluid or drain. By reference to Figures 4, 5, 6 and 7 it will be noted that the groove 74 in each of the plungers 60 and 61 is sufficiently elongated to provide communication between the passageways 88 and 87 when the corresponding plungers are in their uppermost positions. When said plungers are in their lowermost positions, said grooves 74—74 are out of communication with the passageway 87. The groove 75 is sufficiently elongated to provide communication between the pasageways 86 and 87 (Figs. 4 and 5) and the passageways 92 and 93 (Figs. 6 and 7) when the corresponding plunger 60 or 61 is in its lowermost position. When the corresponding plunger 60 or 61 is in its uppermost position, the groove 75 provides communication between the passageways 85 and 86 (Figs. 4 and 5) of passageways 91 and 92 (Figs. 6 and 7). The groove 76 has such dimensions that when the corresponding plunger 60 or 61 is in its lowermost position, said groove communicates with the passageway 85 (Figs. 4 and 5) or passageway 91 (Figs. 6 and 7). When the corresponding plunger 60 or 61 is in its uppermost position, said groove 76 is out of communication with the corresponding passageway 85 (Figs. 4 and 5) and the corresponding passageway 91 (Figs. 6 and 7). Extending through the valve housing 58 are two passageways, indicated by the numeral 101. One of said passageways communicates with the groove 74 and with the space above the plunger 60 in both the upper and lower positions of said plunger 60. The other of said passageways has a like connection with the plunger 61.

The plungers 62 and 63 within the valve housing 59 may be identical and a description of one of said plungers will suffice for a description of both. Each of said plungers is limited in its outward or downward movement by means of the setscrew 102 (Figs. 4 and 5), which setscrew has a reduced end portion riding within a slot 102a disposed longitudinally of the corresponding plunger. Said slot is provided at its upper or inner extremity with a shoulder 102b adapted to engage the extremity of said setscrew 102. Each of the plungers 62 and 63 is provided with a plurality of annular grooves, indicated by the numerals 103, 104, 105 and 106, which grooves are defined by the relatively large portions 107, 108, 109, 110 and 111, which relatively large portions have a slidable, relatively liquid-tight fit within their corresponding bores. Each of the plungers 62 and 63 is provided with a pair of cross passages 112 and 113, which cross passages also communicate with the bore 114 of the corresponding plunger 62 or 63. Said bore 114 in each of said plungers 62 and 63 extends only part way toward the lower extremity of the corresponding plunger 62 or 63. The upper extremity of said bore is closed by the plug 115.

The valve housing 59, which carries the plungers 62 and 63, is provided with passageways 116, 117, 118, 119 and 120 communicating with the bore of the plunger 62. The outer extremity of the passageway 116 is plugged up. The outer extremity of the passageway 118 connects with the conduit 90 hereinabove mentioned. The passageway 120 connects with the conduit 89 hereinabove mentioned. Passageway 117 connects with the conduit 55, which, as stated hereinabove, connects with the right-hand end of the cylinder 40, which controls the clutch element 18. The outer extremity of passageway 119 connects with the conduit 54, which, as indicated above, connects with the left-hand end of said cylinder 40.

The valve housing 59 is also provided with a plurality of passageways communicating with the bore of the plunger 63. Said passageways are indicated by the numerals 121, 122, 123, 124 and 125. The outer extremity of the passageway 121 is plugged up. The outer extremity of the passageway 122 connects with the conduit 56, which leads to the left-hand end of the cylinder 49, which controls the movable clutch element 26. The passageway 124 connects with the conduit 57, which leads to the right-hand end of said cylinder 49. Passageway 123 connects with the conduit 96 above mentioned. Passageway 125 connects with the conduit 95 above mentioned.

The valve housing 59 is provided with a pair of passageways 127 cooperating with the bores of the plungers 62 and 63. The passageway 127 corresponding to the plunger 62 communicates with a space above said plunger 62 and a region in alignment with the passageway 116 (Figs. 4 and 5). The passageway 127 cooperating with the plunger 63 communicates with a space above said plunger and with a region in alignment with the passageway 121. By reference to the cross sectional view appearing in Figure 8, it will be noted that the passageways 116 and 121 are connected by means of the cross passageway 128. Said cross passageway 128 connects with the conduit 129, which leads to the T-connection 99 and the conduit 100 leading to a reservoir of fluid.

The groove 103 is sufficiently elongated to provide communication between the passageway 127 and the corresponding passageway 116 or 121 in either the uppermost or lowermost position of the corresponding plunger 62 or 63. The groove 104 is sufficiently elongated to provide communication between the passageways 117 and 118 (Figs. 4 and 5) and passageways 122 and 123 in the upper positions of the plungers 62 and 63, respectively, but moves out of communication with the passageway 118 or 123 when the corresponding plunger is in its lowermost position. Groove 105 is sufficiently elongated to provide communication between passageways 118 and 119 (Figs. 4 and 5) and passageways 123 and 124 (Figs. 6 and 7) when the corresponding plunger 62 or 63 is in its lowermost position. When said corresponding plunger 62 or 63 is in its uppermost position, the groove 105 provides communication between passageways 119 and 120 (Fig. 4) or passageways 124 and 125 (Figs. 6 and 7).

The mode of operation of the above described instrumentalities is substantially as follows:

The cams 66 upon the shaft 57 will be so disposed that the plungers 60 and 61 will, after each indexing movement of the turret (not shown), be caused to assume positions to control the pressures within the operating cylinders 39 and 49 to cause the clutch elements 18 and 26 to clutch in predetermined gears to produce the spindle speed desired. In case it is desired upon any working stroke of the turret to change the position of either or both of the clutch elements 18 or 26, this result will be accomplished by the choice of the positions of the cams 72—72, which cams cooperate with the plungers 62 and 63. The illustrated embodiment of the invention is intended to operate with one setting of the cams mentioned for a large number of successive operations upon castings or the like carried by the chuck 36.

The parts are illustrated in Figure 1 with the clutch elements 18 and 26 disposed in position to produce the slowest speed of the work holding chuck 36 with a given speed of rotation of the member 17. The layout of the circuits to cause the positioning of the clutch elements 18 and 26 to produce this slow speed is illustrated in Figure 3, in which all of the plungers 60, 61, 62 and 63 are in their lowermost positions. Under these conditions, oil or other fluid under pressure is applied through the conduit 96a to the passageways 86 and 92 (Fig. 9). By reference to Figure 4 it will be noted that the fluid under pressure may pass through the groove 75 in the plunger 60 to the passageway 87, conduit 90, passageway 118, groove 105 in plunger 62, passageway 119 and conduit 54 to the left-hand end of the cylinder 39, moving and holding the piston 40 of said cylinder in its right-hand position. Fluid at the right-hand end of the cylinder 39 and leakage fluid past the piston 40 passes through the conduit 55 to the passageway 117 to groove 104 of plunger 62, cross passage 112, bore 114, groove 106, through conduit 89 to bore 83 of the plunger 60, to passageway 88, to the passageway 97 and conduit 98, to the drain 100. At the same time fluid under pressure may pass from the conduit 96a (Fig. 9) through passageway 92 to the groove 75 of the plunger 61 (Fig. 6). From said groove 75 of plunger 61, said fluid may pass through the passageway 93, conduit 96, passageway 123, groove 105 of plunger 63, to conduit 57 leading to the right-hand end of cylinder 49. The pressure of said fluid will move and hold the piston 48 in its left-hand position, fluid from the left-hand end of said cylinder and leakage fluid past said piston 48 passing through conduit 56, passageway 122, bore 114 of plunger 63, passageway 125, conduit 95, to bore 83 of plunger 61, to passageway 94 (Fig. 10), passageway 97 and conduit 98 to the drain 100. Under these conditions the clutch element 18 is in its left-hand position and the clutch element 26 is in its right-hand position as the parts are viewed in the drawings. As indicated above, the position of the clutch elements 18 and 26 just referred to will result in the slowest speed of rotation of the work holding chuck 36.

According to the layout illustrated in Figure 1, the progression of spindle speeds with any given speed of the driving member 17 is as follows:

(a) For slowest speed of spindle or chuck (referred to herein as first speed), clutch element 18 to the left and clutch element 26 to the right;

(b) Next slowest (referred to herein as second speed), clutch element 18 to the left and clutch element 26 to the left;

(c) Next slowest (referred to herein as third speed), clutch element 18 to the right and clutch element 26 to the right;

(d) Fastest speed (referred to herein as fourth speed), clutch element 18 to the right and clutch element 26 to the left.

The illustrated embodiment of the present invention provides a structure whereby any of the four spindle speeds above referred to may be had at the beginning of any forward or cutting stroke of the turret. According to the structure illustrated, any of said four speeds may be modified during the forward or cutting stroke of the turret to cause the work holding chuck to assume any of the other speeds above mentioned.

The operator may predetermine the speed of the spindle 33 or chuck 36 for any given speed of the driving member 17 by choosing the positions of cams 66—66 and 66a—66a. If the operator should desire that the spindle speed for any forward trip of the turret shall be the slowest among those above referred to, he will so dispose said cams 66—66 and 66a—66a upon the shaft 57 that during that particular forward trip all of the plungers 60, 61, 62 and 63 will be in their lowermost positions. That is to say, during that particular forward trip of the turret, none of the cams 66—66 or 66a—66a will be disposed in position to hold the plungers 60 and 61 in their upper or unbiased positions. If the second speed is required, the cams 66—66 and 66a—66a will be so disposed that plunger 60 is allowed to be in its lowermost position and plunger 61 is held in its uppermost position. If the third spindle speed is required during the forward movement of the turret, said cams 66—66 and 66a—66a will be so disposed that the plunger 60 will be held in its uppermost position and plunger 61 is allowed to remain in its lowermost or biased positions. If the fourth speed is required, said cams 66—66 and 66a—66a will be so disposed that both of the plungers 60 and 61 will be held in their uppermost position by said cams.

The fluid pressure circuits for positioning the clutches 18 and 26 to produce the speeds referred to will now be briefly traced, it being assumed that plungers 62 and 63 are in their lowermost positions, i. e. that cams 72—72 are not holding up said plungers.

For first speed, that is—with clutch element 18 to the left and clutch element 26 to the right: Fluid under pressure may enter through the conduit 96a (Fig. 9) and pass to the grooves 75—75 of the plungers 60 and 61, passing to the conduits 90 and 96, respectively (Figs. 4 and 6), to grooves 105—105 of plungers 62 and 63, respectively, through conduits 54 and 56a, respectively, to deliver fluid to the left-hand end and the right-hand end, respectively, of the cylinders 39 and 49 (Figs. 4 and 6), holding the clutch elements 18 and 26 to their left-hand and right-hand positions, respectively. Fluid from the right-hand and left-hand ends of the cylinders 39 and 49, respectively, will pass through the conduits 55 and 56, respectively, to the bores 114—114 of the plungers 62 and 63, whence said fluid will pass through the conduits 89 and 95, respectively, to the bores 83—83 of the plungers 60 and 61. From said bores 83—83, said fluid (Fig. 10) will pass out through the passageways 88 and 94, respectively, to the conduit 98 leading to the drain 100 (Fig. 3).

For second speed of the spindle, that is—with clutch element 18 to the left and clutch element 26 to the left, plunger 60 is in its lowermost position and plunger 61 is in its uppermost position. Under these conditions fluid under pressure will enter through conduit 96a (Fig. 9), passing to grooves 75—75 of the plungers 60 and 61. Under these conditions said fluid will pass through conduits 90 and 95, respectively (Figs. 4 and 7). Fluid from the conduit 90 will pass through groove 105 of plunger 62 to conduit 54, holding the piston 40 of cylinder 39 to the right, which means that the clutch element 18 is held to the left. Discharge fluid from said cylinder 39 will pass through conduit 55 to groove 104 of plunger 62, bore 114, conduit 89, bore 83 of plunger 60, to the passageway 88, to the conduit 98 leading to the drain 100. Fluid from the conduit 95 will enter the bore 114 of plunger 63, passing out through conduit 56, moving the piston 48 of cylinder 49 to the right, which means that the clutch element 26 will be moved to the left. Discharge fluid from the right-hand end of the cylinder 49 will pass through conduit 57, groove 105 of plunger 63, to conduit 96, which leads under these conditions, plunger 61 being up, to the groove 74 of plunger 61, thence to the passageway 94 and conduit 98 to the drain 100.

For the third speed of the spindle 33, that is—with the plunger 60 in its uppermost position and the plunger 61 in its lowermost position, fluid under pressure will enter through the conduit 96a (Fig. 9) and will pass to grooves 75—75 of the plungers 60 and 61, respectively. From groove 75 of plunger 60, said plunger being up, fluid will pass through the conduit 89 to the bore 114 of plunger 62, thence through conduit 55 to the right-hand end of the cylinder 39, urging the piston 40 toward the left, which means that the clutch element 18 will be moved to the right. Discharge fluid from the left end of cylinder 39 will pass through conduit 54, groove 105 of plunger 62, conduit 90, to groove 74 of plunger 60, said plunger being up at this time. Said discharge fluid will pass from the groove 74 through the passageway 88, to the conduit 98 leading to the drain 100. The fluid which has entered the groove 75 of plunger 61 will pass through conduit 96 to the groove 105 of plunger 63, thence through conduit 56a to the right-hand end of the cylinder 49, urging the piston 48 of said cylinder toward the left, which means that the clutch element 26 will be urged to the right. Discharge fluid from the left-hand end of the cylinder 49 will pass through the conduit 56 to groove 104 of plunger 63 to bore 114 of said plunger 63, through conduit 95 to the bore 83 of plunger 61, whence said fluid will pass from the passageway 94 to the passageway 97 and conduit 98 leading to the drain 100.

For the fourth speed of the spindle, that is—with clutch element 18 to the right and clutch element 26 to the left, plungers 60 and 61 will both be in their uppermost positions. Under these conditions fluid under pressure will enter the conduit 96a and pass to the grooves 75—75 of plungers 60 and 61. From said grooves 75—75, fluid will pass through conduits 89 and 95, respectively (Figs. 4 and 5), to the bores 114—114 of plungers 62 and 63, respectively. From said bores 114—114 said fluid will pass through conduits 55 and 56, respectively, to the left-hand and right-hand ends, respectively, of the cylinders 39 and 49, moving the pistons of said cylinders to their left-hand and right-hand ends, respectively, which means that clutch element 18 is moved to the right and clutch element 26 is moved to the left. Discharge fluid from the left-hand end and right-hand end, respectively, of cylinders 39 and 49 will pass through conduits 54 and 56a, respectively, to the grooves 105—105 of the plungers 62 and 63, respectively. From said grooves 105—105 fluid passes through conduits 90 and 96, respectively, to the grooves 74—74 of the plungers 60 and 61, respectively. From the grooves 74—74 said fluid passes through passageway 97 to conduit 98 and drain 100.

As noted above, the fluid pressure circuits immediately above traced provide for the positioning of the clutch elements 18 and 26 for certain speeds of the spindle 33 or chuck 36 at the portions of the successive forward movements of the turret when the cams 72—72 are not operative to hold up the plungers 62 and 63. As also noted above, the spindle speed may be modified during the forward trip of the turret regardless of the speed of the spindle during the initial portion of the corresponding forward trip of said turret.

Modified circuits will now be briefly traced corresponding to operation of said plungers 62 and 63 with relation to plungers 60 and 61.

Assume first that the cams 66—66 and 66a—66a and 72—72 allow the plungers 60, 61, 62 and 63 to assume their lowermost positions, that is to say—that the spindle is operating at its first or slowest speed. If a cam 72 is positioned to raise the plunger 63 when the shaft 57 advances longitudinally to a predetermined region while plunger 62 is allowed to remain in its lowermost position, the clutch element 18 will be moved to the left and clutch element 26 will be in its left-hand position. As has been indicated hereinabove, this positioning of the clutch elements corresponds to second speed of the spindle 33 or chuck 36. The circuits to produce this positioning of the clutch elements 18 and 26 are briefly as follows: Fluid under pressure will enter through the conduit 96a through grooves 75—75 of plungers 60 and 61. From groove 75 of the plunger 60, fluid will pass through conduit 90 to groove 105 of plunger 62 and conduit 54 to the left-hand end of cylinder 39, moving the piston 40 to the right, which means that the clutch element 18 will be moved to the left. From said groove 75 of plunger 61, fluid will pass through conduit 96 to groove 104, thence through conduit 56 to the left-hand end of cylinder 49, moving the piston thereof to the right, which means that the clutch element 26 is moved to the left. As stated above, the positioning of the two clutch elements 18 and 26 to the left results in second speed of the spindle 33.

If the operator should desire a change of spindle speed during the forward or cutting stroke of the turret from the slow speed to third speed, he will position a cam 72 to raise plunger 62 only. Under these conditions, plungers 60, 61 and 63 will be in their lowermost positions and plunger 62 will be in its uppermost position. Under these conditions fluid under pressure will enter the conduit 96a and will pass to the grooves 75—75 of plungers 60 and 61, respectively. From said grooves 75—75 said fluid will pass to conduits 90 and 96, respectively. Inasmuch as plunger 62 under these conditions is in its uppermost position, fluid will pass through groove 104 to conduit 55. Said fluid under pressure will move the piston 40 to the left, resulting in the positioning of the clutch element 18 to the right. Fluid under pressure flowing through the conduit 96 will enter the groove 105 of plunger 63, passing through conduit 56a to the right-hand end of cylinder 49, moving the piston 48 thereof to the left and positioning the clutch element 26 in its right-hand position. As noted hereinbefore, this positioning of the clutch elements 18 and 26 results in third speed of the spindle 33.

If the operator desires to change from the first or slowest speed of the spindle 33 to the highest speed thereof during the forward or cutting trip of the turret, he will position cams 72—72 to raise both plungers 62 and 63. Under these conditions fluid under pressure will enter through the conduit 96a and will pass to the grooves 75—75 of the plungers 60 and 61, respectively, whence said fluid will pass through the conduits 90 and 96, respectively, to the grooves 104—104 of plungers 62 and 63, respectively, when fluid passes through conduits 55 and 56, respectively, to the right-hand end and left-hand end, respectively, of cylinders 39 and 49, resulting in the positioning of the clutch element 18 to the right and the positioning of the clutch element 26 to the left, corresponding to the fourth speed of the spindle 33.

In tracing the circuits immediately hereinabove, the return circuits from the cylinders 39 and 49 to the drain have not been traced, said return circuits being obvious to those skilled in the art from the disclosure and from the discussion which has appeared above.

It will not be necessary to trace out the various circuits provided for the fluid for all of the various positionings of the plungers 60, 61, 62 and 63. It may be briefly stated that, assuming that the spindle 33 is operating at second speed, that is—with clutch element 18 to the left and clutch element 26 to the left, if the operator desires the spindle to slow down to first speed during any forward stroke of the turret, he will position a cam 72 to raise plunger 63 only. If he desires to step up from second speed to third speed during a forward movement of the turret, he will position cams 72—72 to raise both plungers 62 and 63. If he desires to step up the spindle speed to fourth speed during said forward movement of the turret, he will position a cam 72 to raise plunger 62 only.

Assuming conditions when the spindle 33 is operating at third speed during the initial portion of the forward movement of the turret, if the operator desires a change to first speed during said forward movement, he will position cams 72—72 to raise the plungers 62 and 63. If the operator desires to change to second speed during said forward movement, he will position a cam 72 to raise plunger 62 only. If he desires to step the spindle speed to fourth speed, he will position a cam 72 to raise plunger 63 only.

Under conditions when the spindle 33 is operating at fourth speed or fastest speed during the initial portion of forward movement of the turret, that is—with plungers 60 and 61 both in their uppermost positions, if the operator desires a change of speed intermediate of the length of travel of the turret, he will position cams 72—72 to raise both plungers 62 and 63. If he desires second speed of the spindle during said forward movement of the turret, he will position a cam 72 to raise plunger 62 only. If he desires a change to third speed during said forward movement, he will position a cam 72 to raise plunger 63 only.

The present invention provides a structure in which the turret may perform successive operations upon a piece of work mounted in the chuck 36, the initial speeds in the forward movement of said turret being predetermined by the cams 66 and 66a. Said initial speeds may be changed during the travel of the turret by positioning the cams 72—72. By reason of the automatic change in spindle speed, the machining of pieces of work held by the chuck 36 may be accomplished with great speed and high efficiency.

Though a preferred embodiment of the present invention has been described in detail, many modifications will occur to those skilled in the art. It is intended to cover all such modifications that fall within the scope of the appended claims.

What is claimed is—

1. In combination, in a turret lathe, a driving member, a work holding device, gears for connecting said driving member to said device, and a plurality of clutches for selectably connecting said gears to produce changes of speed in said device for a given speed of said driving means, fluid pressure responsive means for operating said clutches, a rotatable and longitudinally movable member whose rotative positions vary with the indexing positions of the turret of said turret lathe and whose longitudinal positions vary with the longitudinal movement of said turret, and a pair of valves for controlling the fluid pressure responsive means associated with each of said clutches, one valve of each of said pairs being responsive to said rotatable and longitudinally movable member in its rotative positions and the other valve of each of said pairs being responsive to said rotatable and longitudinally movable member in its longitudinal positions.

2. In a turret lathe, in combination, a work holding device, speed change gears for driving said device, a plurality of clutches for selectably connecting said gears to said work holding device, fluid pressure responsive means for operating said clutches, a set of conduits for connecting each of said fluid pressure responsive means to a source of fluid pressure, and a pair of valves in each of said sets, one of said valves being responsive to the indexed position of the turret of said lathe, the other of said valves being responsive to the longitudinal position of said turret.

3. In a turret lathe, in combination, a spindle, a drive shaft, change speed gears between said drive shaft and said spindle, a plurality of clutches for controlling the speed ratios between said drive shaft and said spindle through said gears, a plurality of fluid responsive means for actuating said clutches, a rotatable and longitudinally movable instrumentality responsive to the indexing and longitudinal movements of the turret of said turret lathe, valve means associated with said fluid pressure responsive means for controlling the fluid pressure thereon, said instrumentality being provided for controlling said valve means in response to rotation of said instrumentality, other valve means for controlling the connection of said fluid responsive means to a source of fluid pressure, said instrumentality being provided with means responsive to its longitudinal position for controlling said other valve means.

4. In a turret lathe, in combination, a drive shaft, a spindle, a plurality of selectable gears, a plurality of clutches for selectably connecting said gears between said drive means and said spindle to control the driving ratio between said drive means and said spindle, a fluid pressure responsive member cooperatively associated with each of said clutches, a set of valves for controlling the connections of said fluid pressure responsive means to a source of pressure, a second set of valves for controlling the connection of said fluid pressure responsive means to said source of pressure, means responsive to the indexing positions of the turret of said turret lathe for controlling certain valves in said sets of valves, and means responsive to the longitudinal position of the turret of said turret lathe for controlling certain other valves in said sets of valves.

5. In a turret lathe, in combination, a spindle, drive mechanism therefor, a plurality of clutches for controlling the speed ratio of said drive mechanism, a fluid pressure responsive member cooperatively associated with each of said clutches, a rotatable and longitudinally movable shaft responsive to the indexing movements and longitudinal movements of the turret of said turret lathe, valve means for controlling said fluid pressure responsive means in response to rotative movement of said shaft and other valve means for controlling said fluid pressure responsive means in response to longitudinal movement of said shaft.

6. Clutch operating means comprising, in combination, a fluid responsive cylinder, conduits connected thereto, and a pair of valves for controlling the connections of said conduits, a shaft, said shaft being both rotatable and longitudinally movable, means responsive to the rotation of said shaft for reversing the pressures within said conduits, and means responsive to the longitudinal movement of said shaft for reversing the pressures within said conduits.

7. In change speed mechanism, a plurality of operating cylinders, a pair of conduits cooperatively associated with each of said cylinders, a pair of valves cooperatively associated with each of said cylinders for controlling the relative pressures of fluid within each of said pairs of conduits, a shaft, said shaft being both rotatable and longitudinally movable, means responsive to the rotation of said shaft for controlling one valve of each of said pairs of valves, and means responsive to the longitudinal movement of said shaft for controlling the other valve of each of said pairs of valves.

8. In change speed mechanism, a plurality of operating cylinders, a pair of conduits cooperatively associated with each of said cylinders, a pair of valves cooperatively associated with each of said cylinders for controlling the relative pressures of fluid within each of said pairs of conduits, a shaft, said shaft being both rotatably and longitudinally movable, means responsive to the rotation of said shaft for controlling one valve of each of said pairs of valves, and means responsive to the longitudinal movement of said shaft for controlling the other valve of each of said pairs of valves, one valve of one of said pairs of valves being connected in series with one valve of the other pair of valves, the other valves of said pairs of valves being also connected in series.

9. In change speed mechanism, in combination, an operating cylinder, a pair of conduits cooperatively associated with said cylinder, a valve for controlling the relative pressures within said conduits, another valve connected to said first-mentioned valve for cooperating with said first-mentioned valve for controlling the relative pressures within said conduits, a shaft, said shaft being both rotatably and longitudinally movable, and means responsive to the rotation of said shaft for controlling one of said valves and means responsive to the longitudinal movement of said shaft for controlling the other of said valves.

10. In change speed mechanism, in combination, an operating cylinder, a pair of conduits cooperatively associated with said cylinder, a valve for controlling the relative pressures within said conduits, another valve, fluid pressure transmitting means between said valves, each of said valves having a pair of operative positions and each adapted to change the relative pressures within said conduits, a shaft, said shaft being both rotatably and longitudinally movable, means responsive to the rotation of said shaft for controlling one of said valves and means responsive to the longitudinal movement of said shaft for controlling the other of said valves.

11. In change speed mechanism, in combination, an operating cylinder having a reciprocable piston therein, conduit means for delivering fluid to and discharging fluid from the two sides of said piston, a valve connected to said conduits for controlling the direction of fluid flow to and from said cylinder, another valve, fluid transmitting means between said valves, said other valve being adapted to control the direction of fluid flow through said fluid transmitting means between said valves, a shaft, said shaft being both rotatably and longitudinally movable, means responsive to the rotation of said shaft for controlling one of said valves, and means responsive to the longitudinal movement of said shaft for controlling the other of said valves.

12. In change speed mechanism, in combination, a pair of double-acting clutches, an operating cylinder for each of said clutches, a pair of conduits connected to each of said cylinders for delivering fluid under pressure to and discharging fluid under pressure from said cylinders, a pair of valves each adapted to control the reversal of fluid flow through a corresponding pair of said conduits, a second pair of valves each of which is cooperatively associated with a corresponding one of said first-mentioned valves for controlling the reversal of fluid flow through said conduits, a shaft, said shaft being both rotatably and longitudinally movable, means responsive to the rotation of said shaft for controlling one of said valves, and means responsive to the longitudinal movement of said shaft for controlling the other of said valves.

13. In change speed mechanism, in combination, a pair of double-acting clutches, an operating cylinder for each of said clutches, a pair of conduits connected to each of said cylinders for delivering fluid under pressure to and discharging fluid under pressure from said cylinders, a pair of valves each adapted to control the reversal of fluid flow through a corresponding pair of said conduits, a second pair of valves each of which is connected in series with a corresponding one of said first-mentioned valves for controlling the reversal of fluid flow through said conduits, a shaft, said shaft being both rotatably and longitudinally movable, means responsive to the rotation of said shaft for controlling one of said valves, and means responsive to the longitudinal movement of said shaft for controlling the other of said valves.

14. In a turret lathe, in combination, a pair of clutches, an operating cylinder for each of said clutches, a pair of valves for controlling the direction of fluid pressure applied to said cylinders, a second pair of valves for controlling the direction of fluid pressure applied to said cylinders, one valve of said second pair, one valve of said first pair, and one of said cylinders being connected in a series circuit, the other valve of said second pair, the other valve of said first pair, and said other cylinder being connected in a series circuit.

15. In a turret lathe, in combination, a pair of clutches, an operating cylinder for each of said clutches, a pair of valves for controlling the direction of fluid pressure applied to said cylinders, a second pair of valves for controlling the direction of fluid pressure applied to said cylinders, one valve of said second pair, one valve of said first pair and one of said cylinders being connected in a series circuit, the other valve of said second pair, the other valve of said first pair and said other cylinder being connected in a series circuit, a shaft, said shaft being both rotatably and longitudinally movable, means responsive to the rotation of said shaft for controlling one of said valves, and means responsive to the longitudinal movement of said shaft for controlling the other of said valves.

16. In a turret lathe, in combination, a shaft, said shaft being rotatably and also longitudinally movable, a cam holding member non-rotatably but slidably mounted upon said shaft, a plurality of sets of cams disposed upon said cam holding member, said sets being spaced longitudinally of said shaft, and a second cam holding member adjustably but fixedly mounted upon said shaft, said second cam holding member having cam holding apertures and cams in said apertures disposed longitudinally of said shaft.

17. In speed change mechanism, in combination, a pair of valves, a shaft, a cam holding member non-rotatably mounted upon said shaft though axially movable relative to said shaft, cams upon said cam holding member adapted to operate said valves in the rotative movement of said shaft, a second pair of valves, and cams fixedly but adjustably carried by said shaft for operating said second pair of valves in the longitudinal movement of said shaft.

18. In a turret lathe, a spindle, change speed mechanism cooperatively associated with said spindle, clutch mechanism for selecting the driving ratio of said change speed mechanism, a plurality of fluid pressure means for controlling said clutch mechanism, valve means responsive to the indexing movements of the turret of said turret lathe for controlling said fluid pressure means, and valve means responsive to the longitudinal movement of the turret of said turret lathe for controlling said fluid pressure means.

19. In change speed mechanism, in combination, an operating cylinder, a pair of conduits cooperatively associated with said cylinder, a valve for controlling the relative pressures within said conduits, another valve, fluid pressure transmitting means between said valves connecting said valves in series, each of said valves having a pair of operative positions and each adapted to change the relative pressures within said conduits, a shaft, said shaft being both rotatably and longitudinally movable, means responsive to the rotation of said shaft for controlling one of said valves and means responsive to the longitudinal movement of said shaft for controlling the other of said valves.

Signed at Elkhart, Indiana, this 15th day of August, 1930.

WILLIAM H. FOSTER.